US007901797B2

(12) United States Patent
Kuno et al.

(10) Patent No.: US 7,901,797 B2
(45) Date of Patent: Mar. 8, 2011

(54) LOW-ADHESION MATERIAL, RESIN MOLDING DIE, AND SOIL RESISTANT MATERIAL

(75) Inventors: Takaki Kuno, Kyoto (JP); Yoshinori Noguchi, Kyoto (JP); Keiji Maeda, Kyoto (JP); Satoshi Kitaoka, Nagoya (JP); Naoki Kawashima, Nagoya (JP)

(73) Assignees: Towa Corporation, Kyoto-shi (JP); Japan Fine Ceramics Center, Nagoya-shi (JP)

( * ) Notice: Subject to any disclaimer, the term of this patent is extended or adjusted under 35 U.S.C. 154(b) by 49 days.

(21) Appl. No.: 11/988,802

(22) PCT Filed: Dec. 27, 2006

(86) PCT No.: PCT/JP2006/326026
§ 371 (c)(1),
(2), (4) Date: Jan. 15, 2008

(87) PCT Pub. No.: WO2007/116571
PCT Pub. Date: Oct. 18, 2007

(65) Prior Publication Data
US 2009/0107361 A1    Apr. 30, 2009

(30) Foreign Application Priority Data

Apr. 11, 2006  (JP) .................................. 2006-108869

(51) Int. Cl.
*B32B 9/00* (2006.01)
(52) U.S. Cl. ......... 428/697; 428/689; 428/699; 428/701; 428/702
(58) Field of Classification Search .................. 428/689, 428/697, 699, 701, 702
See application file for complete search history.

(56) References Cited

U.S. PATENT DOCUMENTS

| 2005/0154113 A1* | 7/2005 | Kuno et al. | .................... 524/430 |
| 2006/0093693 A1* | 5/2006 | Kuno et al. | ................ 425/129.1 |

FOREIGN PATENT DOCUMENTS

| JP | 4-149074 A | 5/1992 |
| JP | 4-364945 A | 12/1992 |
| JP | 7-52120 A | 2/1995 |
| JP | 2005-274478 A | 10/2005 |
| JP | 2007-197251 A | 8/2007 |
| WO | WO-2005/092587 A1 | 10/2005 |

OTHER PUBLICATIONS

Srinivasan et al., "R curve effects in solid particle erosion of ceramics". Wear, 142 (1991) pp. 115-133.

* cited by examiner

*Primary Examiner* — Gwendolyn Blackwell
(74) *Attorney, Agent, or Firm* — Birch, Stewart, Kolasch & Birch, LLP

(57) ABSTRACT

An upper die has a cavity member constituting an inner bottom surface of a cavity, and a surrounding member. The cavity member is formed of a low adhesion material in accordance with the present invention, and includes a body portion and a surface layer formed on an undersurface of the body portion exposed to a fluid resin. The body portion is formed of a first material of 3YSZ and a second material of ZrN that are mixed at a predetermined ratio. The surface layer is formed of $Y_2O_3$ having a low adhesion property with respect to a set resin, and has a thermal expansion coefficient smaller than that of the body portion. By bonding the body portion and the surface layer at a high temperature and then cooling them down, compressive residual stress is caused in the surface layer due to a difference in the thermal expansion coefficients thereof, and the compressive residual stress is present in the surface layer.

15 Claims, 3 Drawing Sheets

US 7,901,797 B2

LOW-ADHESION MATERIAL, RESIN MOLDING DIE, AND SOIL RESISTANT MATERIAL

TECHNICAL FIELD

The present invention relates to a material less adhesive to basic substances, that is, a low adhesion material, a resin molding die in which at least a portion of a die surface is formed of such a low adhesion material, and a soil resistant material having a function preventing adhesion of soil made of an organic substance.

BACKGROUND ART

In conventional resin sealing molding, transfer molding or injection molding has been used. In transfer molding or injection molding, a resin flow channel and a cavity each provided to a die for resin molding are used. A fluid resin is introduced into the cavity through the resin flow channel. The introduced fluid resin is set to form a set resin. Thereby, a molded object having the set resin is completed. For example, thermosetting resin such as epoxy resin or the like is used as the fluid resin, and a steel material such as tool steel, a cemented carbide (a WC—Co type alloy), or the like is used as a material for the die. It is preferable in this case to reduce adhesion property between the set resin and the surface of the die (die surface), in other words, to improve releasability between the set resin and the die surface, for easy removal of the molded object.

The inventors of the present application have found that $Y_2O_3$ (yttria), which is a sintered body stable in the air, has a low-adhesion property with respect to epoxy resin. The term "low adhesion property" described herein refers to "having a low adhesion property when comparison is made in terms of adhesion property between a conventional material for a die such as a steel material, a cemented carbide, or the like and a basic substance represented by epoxy resin". The inventors of the present application have proposed to use an oxide such as $Y_2O_3$ (a basic oxide) to form a die surface or a resin molding die (see Japanese Patent Laying-Open No. 2005-274478, pages 8 to 9 and FIG. 2).

In another patent application filed by the applicants of the present application, a $Y_2O_3$ solid solution, an yttria composite oxide ($LaYO_3$), and a mixture of a $Y_2O_3$ solid solution and an yttria composite oxide are described as low adhesion materials forming a resin molding die (Japanese Patent Application No. 2006-017335). According to these techniques, a basic oxide such as $Y_2O_3$, a $Y_2O_3$ solid solution, or the like, which is a material less adhesive to a set resin, is contained in a material for a resin molding die forming a die surface. Thereby, a resin molding die excellent in releasability is implemented. It is to be noted that the invention disclosed in Japanese Patent Application No. 2006-017335 has not been published yet.

However, according to the conventional techniques described above, that is, the techniques of using a material for a resin molding die containing a basic oxide such as $Y_2O_3$, a $Y_2O_3$ solid solution, or the like (hereinafter referred to as a "basic oxide or the like") to form a die surface or a resin molding die, there are two problems as described below.

The first problem is that the resin molding die has insufficient wear resistance. This can be highly problematic especially when a chip-type electronic component (hereinafter referred to as a "chip") such as an LSI (Large Scale Integration) chip mounted on a lead frame, a printed board (hereinafter referred to as a "board"), or the like is sealed with resin. In this case, thermosetting resin (for example, epoxy resin) containing a ceramic filler is used as a fluid resin. The basic oxide or the like forming the die surface of the resin molding die is worn by the filler.

The second problem is that the basic oxide or the like is likely to have chipping when impact is applied from outside, in other words, it has low impact resistance. Therefore, although it is possible to obtain a resin molding die excellent in releasability according to the techniques of using a basic oxide or the like, which is merely a low adhesion material, to form a die surface or a resin molding die, it has been difficult to obtain a resin molding die having both excellent wear resistance and impact resistance. Patent Document 1: Japanese Patent Laying-Open No. 2005-274478 (pages 8 to 9, FIG. 2)

DISCLOSURE OF THE INVENTION

Problems to be Solved by the Invention

The problem to be solved by the present invention is that it is difficult to obtain a low adhesion material or a solid resistant material having both excellent wear resistance and impact resistance, and obtain a resin molding die having both excellent wear resistance and impact resistance in addition to excellent releasability.

Means for Solving the Problems

Explanation will be given on wear before describing means for solving the problem. Wear described herein refers to erosion wear. According to a document (S. Srinivasan and R. O. Scattergood, R curve effects in solid particle erosion of ceramics, Wear, 142 (1991) 115), the erosion wear is reduced with increase in material hardness (H) and a fracture toughness value (KIC) (see the equation described in table 1 on page 117 of the document). Therefore, to improve wear resistance of a brittle material with respect to solid particles, it is generally effective to increase a fracture toughness value. Increasing a fracture toughness value is also effective to improve impact resistance of a brittle material. In view of these, the inventors of the present invention made the invention as described below.

To solve the problem described above, a low adhesion material in accordance with the present invention is a low adhesion material having a low adhesion property with respect to a basic substance, including a body portion and a surface layer formed on at least a portion of a surface of the body portion. The surface layer is formed of a material having a low adhesion property with respect to the basic substance and a thermal expansion coefficient smaller than that of the body portion. The surface layer is formed on the body portion at a high temperature. The body portion and the surface layer are cooled down to cause compressive residual stress in the surface layer, and as a result, the compressive residual stress is present in the surface layer.

In the low adhesion material in accordance with the present invention, it is desirable that the surface layer contains at least one of $Y_2O_3$, a $Y_2O_3$ solid solution, and an yttria composite oxide.

In the low adhesion material in accordance with the present invention, it is desirable that the body portion contains a first material of a $ZrO_2$ material mainly composed of $ZrO_2$ and containing $Y_2O_3$, $CeO_2$, or the like, and a second material having a thermal expansion coefficient smaller than that of the first material.

In the low adhesion material in accordance with the present invention, it is desirable that the body portion has conductivity.

Further, a resin molding die in accordance with the present invention is used to set a fluid resin introduced into a cavity to form a set resin made of a basic substance and mold a molded object including the set resin. The resin molding die includes a body portion provided to overlap at least a portion of a die surface exposed to the fluid resin, and a surface layer formed on a surface of the body portion to constitute at least a portion of the die surface exposed to the fluid resin. The surface layer is formed of a material having a low adhesion property with respect to the set resin and a thermal expansion coefficient smaller than that of the body portion. The surface layer is formed on the body portion at a high temperature. The body portion and the surface layer are cooled down to cause compressive residual stress in the surface layer, and as a result, the compressive residual stress is present.

In the resin molding die in accordance with the present invention, it is desirable that the surface layer contains at least one of $Y_2O_3$, a $Y_2O_3$ solid solution, and an yttria composite oxide.

In the resin molding die in accordance with the present invention, it is desirable that the body portion contains a first material of a $ZrO_2$ material mainly composed of $ZrO_2$ and containing $Y_2O_3$, $CeO_2$, or the like, and a second material having a thermal expansion coefficient smaller than that of the first material.

In the resin molding die in accordance with the present invention, it is desirable that the body portion has conductivity.

Further, the low adhesion material in accordance with the present invention can also be used as a soil resistant material having a function preventing adhesion of soil made of an organic substance.

EFFECTS OF THE INVENTION

The low adhesion material in accordance with the present invention includes a body portion and a surface layer formed on at least a portion of a surface of the body portion. The surface layer is formed of a material having a low adhesion property with respect to a basic substance and a thermal expansion coefficient smaller than that of the body portion. The surface layer is formed on the body portion at a high temperature. By cooling down the body portion and the surface layer, compressive residual stress is caused in the surface layer due to a difference in the thermal expansion coefficients of the body portion and the surface layer, and the compressive residual stress is present in the surface layer. It can be considered that the presence of the compressive residual stress in the surface layer increases a fracture toughness value of the surface layer. Therefore, a low adhesion material having excellent wear resistance and impact resistance can be obtained by increasing the fracture toughness value of the surface layer. In addition, a resin molding die having excellent releasability, wear resistance, and impact resistance can be obtained by using the low adhesion material to form at least a portion of a die surface.

Further, according to the present invention, at least one of $Y_2O_3$, a $Y_2O_3$ solid solution, and an yttria composite oxide, each having a low adhesion property with respect to a basic substance, may be contained in the surface layer of the low adhesion material described above. In this case, a low adhesion material containing $Y_2O_3$ and excellent in low adhesion property with respect to a basic substance, wear resistance, and impact resistance can be obtained. In addition, a resin molding die having excellent releasability, wear resistance, and impact resistance can be obtained by using the low adhesion material to form at least a portion of a die surface.

Further, according to the present invention, the body portion contains a first material of a $ZrO_2$ material, and a second material having a thermal expansion coefficient smaller than that of the first material. The difference in the thermal expansion coefficients of the body portion and the surface layer can be changed by changing the ratio between the first material and the second material. Therefore, a low adhesion material in which the difference in the thermal expansion coefficients of the body portion and the surface layer is optimally determined to prevent interfacial peeling from occurring between the body portion and the surface layer and to increase the fracture toughness value of the surface layer can be obtained. In addition, a resin molding die having excellent releasability, wear resistance, and impact resistance can be obtained by using the low adhesion material to form at least a portion of a die surface.

Further, according to the present invention, when the body portion has conductivity, an inner bottom surface of a cavity and a die surface of a resin molding die can be heated efficiently by causing the body portion itself to generate heat. Thereby, energy for heating the resin molding die can be reduced. Herein, to cause the body portion itself to generate heat, it is only necessary to supply a current to the body portion or generate an induced current by electromagnetic induction to cause self heating of the body portion. In addition, the conductivity of the body portion can be utilized to perform precision machining by means of electrical discharge machining on the body portion.

The foregoing and other objects, features, aspects and advantages of the present invention will become more apparent from the following detailed description of the present invention when taken in conjunction with the accompanying drawings.

DESCRIPTION OF THE REFERENCE SIGNS

Figure 1:
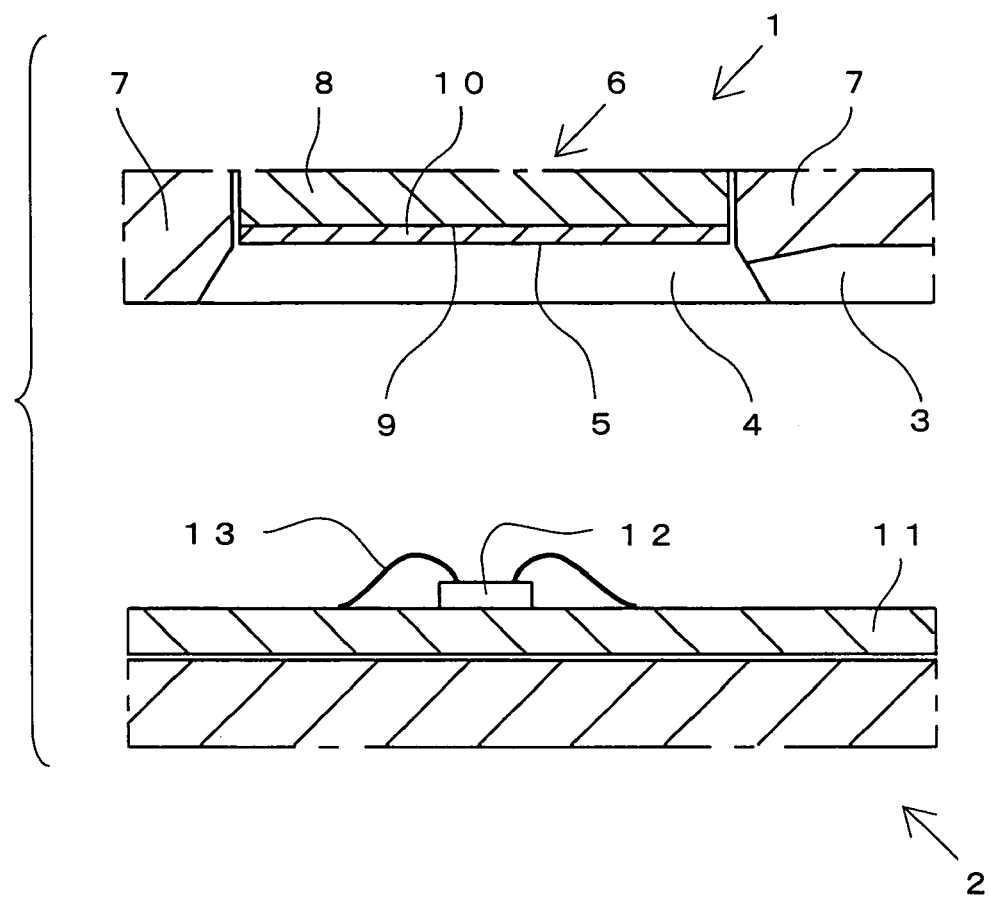
FIG. 1 is a cross sectional view showing a resin molding die in accordance with a first embodiment of the present invention.

1: upper die (resin molding die), 2: lower die, 3: resin flow channel, 4: cavity, 5: inner bottom surface, 6: cavity member (low adhesion material), 7: surrounding member, 8, 15: body portion, 9, 16: undersurface, 10, 17: surface layer, 11: board, 12: chip, 13: wire, 14: upper die (low adhesion material, resin molding die), 18: die surface.

BEST MODES FOR CARRYING OUT THE INVENTION

An upper die 1 has a rectangular parallelepiped cavity member 6 constituting an inner bottom surface 5 of a cavity 4, which is a portion of a die surface, and a surrounding member 7 constituting a portion other than cavity member 6. Cavity member 6 is formed of a low adhesion material in accordance with the present embodiment, and specifically, it includes a body portion 8 and a surface layer 10 formed on an undersurface 9 of body portion 8, which is a surface of body portion 8 on a side exposed to a fluid resin. Body portion 8 is formed of a first material of 3YSZ (3 mol % of $Y_2O_3$, 97 mol % of $ZrO_2$) and a second material of ZrN having conductivity that are mixed at a predetermined ratio, and has a thermal expansion coefficient of $10.5 \times 10^{-6}$/° C. Surface layer 10 is formed of $Y_2O_3$ having a low adhesion property with respect to a set resin, and has a thermal expansion coefficient of $8.4 \times 10^{-6}$/° C., which is smaller than that of body portion 8. By bonding body portion 8 and surface layer 10 at a high temperature and then cooling them down, compressive residual stress is caused in surface layer 10 due to a difference in the thermal expansion coefficients of body portion 8 and surface layer 10, and the compressive residual stress is present in surface layer 10.

First Embodiment

A resin molding die and a low adhesion material in accordance with a first embodiment of the present invention will be described with reference to FIGS. 1 to 3. The low adhesion material is a laminated structure including a rectangular parallelepiped body portion and a surface layer formed on one surface of the body portion.

Figure 2:
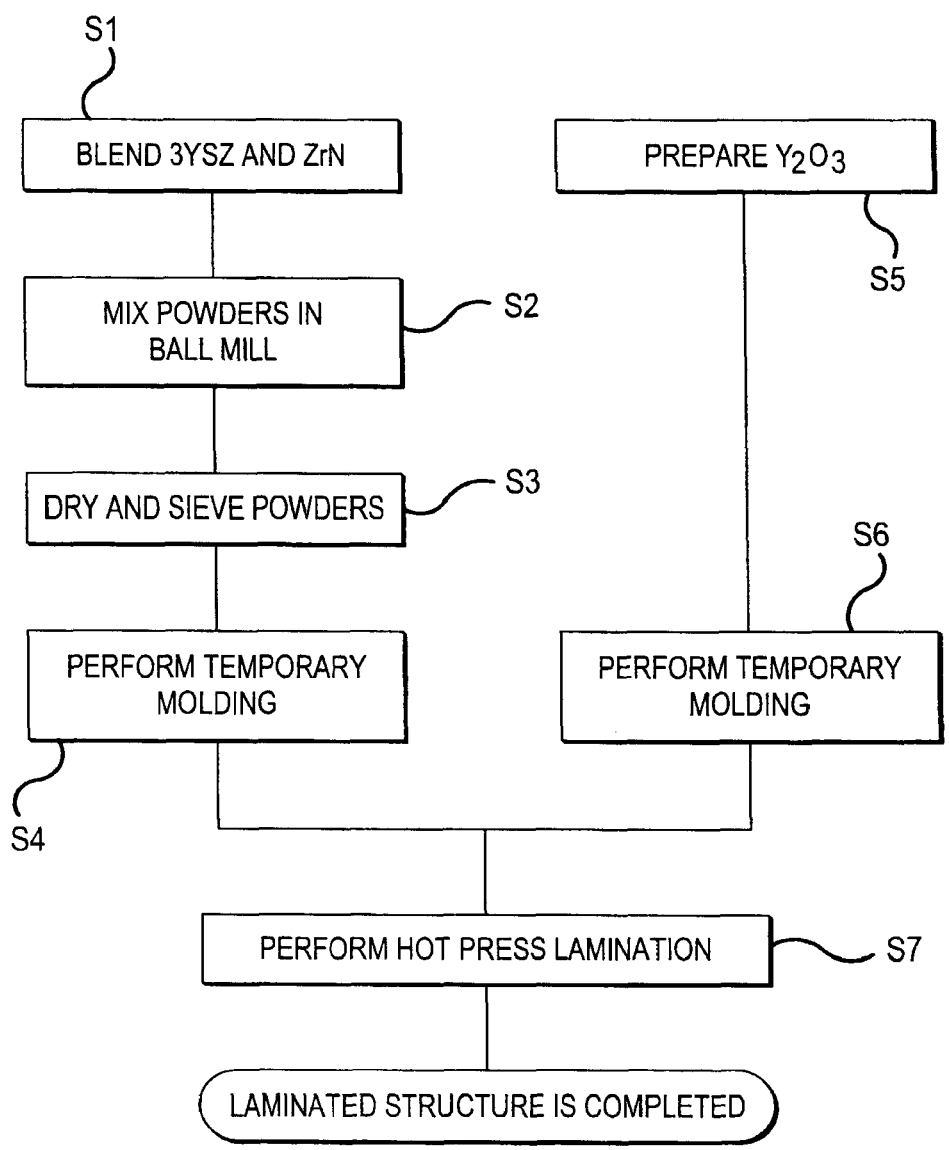
FIG. 2 is a flow chart showing a process of manufacturing a low adhesion material in accordance with the first embodiment of the present invention.

FIG. 1 is a cross sectional view showing a resin molding die in accordance with the present embodiment. FIG. 2 is a flow chart showing a process of manufacturing a low adhesion material in accordance with the present embodiment. FIG. 3 is an explanatory view showing a relationship between a thickness of a surface layer in the low adhesion material in accordance with the present embodiment and a fracture toughness value of the low adhesion material.

All the drawings described below are exaggerated for ease of illustration.

Further, in the description below, explanation will be given on a case where a chip mounted on a board is sealed with resin by transfer molding as an example of resin molding. In this sealing with resin, firstly, a wired chip is accommodated in a cavity. Next, with a set of resin sealing dies closed, a fluid resin is introduced into the cavity. Thereafter, the fluid resin is set to form a set resin. Thereby, a molded object (package) having a board and the set resin is completed.

Upper die 1 and a lower die 2 shown in FIG. 1 together constitute a resin molding die. Upper die 1 corresponds to a resin molding die in accordance with the present embodiment. Upper die 1 is provided with a resin flow channel 3 through which the fluid resin (not shown) flows, and cavity 4 communicating with resin flow channel 3 to be filled with the fluid resin, which are each provided in a concave shape. Further, upper die 1 has rectangular parallelepiped cavity member 6 constituting inner bottom surface 5 of cavity 4, which is a portion of the die surface, and surrounding member 7 constituting a portion other than cavity member 6.

Cavity member 6 is formed of the low adhesion material in accordance with the present embodiment, and specifically, it includes body portion 8 and surface layer 10 formed on undersurface 9 of body portion 8, which is a surface of body portion 8 exposed to the fluid resin. Accordingly, surface layer 10 is exposed at inner bottom surface 5 of cavity 4, which is a portion of the die surface of the resin molding die exposed to the fluid resin. Materials forming body portion 8 and surface layer 10 will be described later.

Lower die 2 is formed of an ordinary material for a resin molding die, for example, a steel material such as tool steel, a cemented carbide, or the like. A board 11 is placed on a die surface of lower die 2. A chip 12 is mounted on board 11, and electrodes (not shown) of board 11 and chip 12 are electrically connected by a wire 13. Lower die 2 may be formed of a ceramic material having a prescribed mechanical property.

Materials forming body portion 8 and surface layer 10 of cavity member 6 formed of the low adhesion material in accordance with the present embodiment will now be described. Firstly, body portion 8 contains a first material and a second material having a thermal expansion coefficient smaller than that of the first material. In the present embodiment, body portion 8 is formed of the first material of 3YSZ (3 mol % of $Y_2O_3$, 97 mol % of $ZrO_2$), which is a YSZ (stabilized $ZrO_2$ containing $Y_2O_3$) material, and the second material of ZrN having conductivity. The ratio between the first material and the second material is 75 vol %:25 vol %.

Herein, 3YSZ has a thermal expansion coefficient of $11.4 \times 10^{-6}$/° C., and ZrN has a thermal expansion coefficient of $7.8 \times 10^{-6}$/° C. Thus, the material formed of 3YSZ and ZrN mixed at the ratio described above (the material forming body portion 8) has a thermal expansion coefficient of $10.5 \times 10^{-6}$/° C. The first material may be any $ZrO_2$ material mainly composed of $ZrO_2$ and containing $Y_2O_3$, $CeO_2$, or the like. As the second material, any material having an appropriate thermal expansion coefficient smaller than that of the first material may be used. For example, $ZrB_2$ or the like having conductivity, or a nonconductive material can be used.

Body portion 8 is formed in cavity member 6 as described above because of the following three reasons. The first reason is that cavity member 6 should have a prescribed mechanical property required as a resin molding die. Herein, the term "mechanical property" refers to, for example, fracture strength, fracture toughness, impact resistance, or the like. The second reason is that the difference in the thermal expansion coefficients of the materials forming body portion 8 and surface layer 10 should be reduced, and that body portion 8 should have a thermal expansion coefficient greater than that of surface layer 10. The third reason is that it is desirable that body portion 8 has a predetermined conductivity.

Further, in cavity member 6, surface layer 10 contains at least one of $Y_2O_3$, a $Y_2O_3$ solid solution, and an yttria composite oxide. Thereby, surface layer 10 has a low adhesion property with respect to a set resin. In the present embodiment, surface layer 10 is formed of $Y_2O_3$. Surface layer 10 is formed to be bonded to the surface of body portion 8 (undersurface 9 in the drawing) by a high-temperature process, that is, a process performed at a high temperature.

Herein, $Y_2O_3$ has a thermal expansion coefficient of $8.4 \times 10^{-6}$/° C., which is smaller than the thermal expansion coefficient of body portion 8 ($10.5 \times 10^{-6}$/° C.). Further, the high-temperature process is performed at a temperature enough to cause a certain amount of compressive residual stress in surface layer 10 when body portion 8 and surface layer 10 described above are bonded and then cooled down, due to the difference in the thermal expansion coefficients thereof.

Upper die 1 having cavity member 6 described above has the following four characteristics. The first characteristic is that the surface of body portion 8 having conductivity and a prescribed mechanical strength is provided with surface layer 10 bonded at a high temperature, and that the thermal expansion coefficient of surface layer 10 ($8.4 \times 10^{-6}$/° C.) is smaller than the thermal expansion coefficient of body portion 8 ($10.5 \times 10^{-6}$/° C.).

When body portion 8 and surface layer 10 are bonded at a high temperature and then cooled down, compressive residual stress is caused in surface layer 10 due to the difference in the thermal expansion coefficients of body portion 8 and surface layer 10, and the compressive residual stress is present in surface layer 10. It can be considered that the presence of the compressive residual stress in surface layer 10 increases a fracture toughness value of surface layer 10. Therefore, a resin molding die formed of a low adhesion material having excellent wear resistance and impact resistance can be obtained.

The second characteristic is that surface layer 10 is formed of $Y_2O_3$, which is a material having a low adhesion property with respect to a set resin. Thereby, a resin molding die formed of a low adhesion material having excellent releasability can be obtained.

The third characteristic is that body portion 8 is formed of 3YSZ having a thermal expansion coefficient of $11.4 \times 10^{-6}/°$C. (the first material) and ZrN having a thermal expansion coefficient of $7.8 \times 10^{-6}/°$ C. (the second material) that are mixed at a predetermined ratio.

Thereby, the thermal expansion coefficient of body portion 8 ($10.5 \times 10^{-6}/°$ C.) is set at an appropriate value greater than and close to the thermal expansion coefficient of surface layer 10 ($8.4 \times 10^{-6}/°$ C.). Such a combination of the thermal expansion coefficients of body portion 8 and surface layer 10 can prevent interfacial peeling from occurring when body portion 8 and surface layer 10 are bonded at a high temperature. Therefore, a low adhesion material having no interfacial peeling caused between body portion 8 and surface layer 10, and a resin molding die formed of the low adhesion material can be obtained.

The fourth characteristic is that body portion 8 has conductivity. Thereby, it is possible to cause self heating of body portion 8 by supplying a current to body portion 8 or generating an induced current by electromagnetic induction. Therefore, inner bottom surface 5 of cavity 4 in resin molding die 1 can be heated efficiently by causing body portion 8 itself to generate heat.

This can save energy required to heat resin molding die 1. Further, the conductivity of body portion 8 can be utilized to perform precision machining by means of electrical discharge machining on body portion 8 as necessary.

An operation of the resin molding die shown in FIG. 1 will be described. Firstly, board 11 is positioned and placed on lower die 2, and fixed to lower die 2 by means of absorption or the like. Thereafter, upper die 1 is lowered to close the upper die and lower die 2. Next, a fluid resin (not shown) made of thermosetting resin and having a prescribed viscosity is pushed by a plunger (not shown). Thereby, the fluid resin is introduced into cavity 4 through resin flow channel 3.

Next, the fluid resin is heated by a heater (not shown) provided to upper die 1 and lower die 2, and the fluid resin is set to form a set resin. In this step, a current may be supplied to body portion 8 having conductivity, or an induced current may be generated by electromagnetic induction to cause self heating of body portion 8. Then, upper die 1 is raised to open upper die 1 and lower die 2, and a molded object in which board 11, chip 12, and wire 13 are integrally sealed with the set resin is released from upper die 1. In this step, the set resin is easily released from surface layer 10 formed of $Y_2O_3$ having a low adhesion property with respect to the set resin.

As described above, according to the present embodiment, a low adhesion material excellent in low adhesion property, wear resistance, and impact resistance can be obtained. Further, a resin molding die formed of the low adhesion material and having excellent releasability can be obtained.

The low adhesion material and the resin molding die in accordance with the present embodiment are manufactured by a method as described below. Firstly, as shown in FIG. 2, at step S1, powders of 3YSZ and ZrN, which are the materials for body portion 8, are blended at a predetermined ratio. Next, at step S2, the blended powders are mixed in a ball mill. Then, at step S3, the materials mixed in the ball mill are dried and sieved. Thereafter, at step S4, temporary molding is performed to complete a rectangular parallelepiped member (corresponding to body portion 8 of FIG. 1).

Further, apart from fabrication of the rectangular parallelepiped member described above, as shown in FIG. 2, at step S5, powders of $Y_2O_3$, which is the material for surface layer 10, are prepared in an amount as required. Next, at step S6, the powders of $Y_2O_3$ are temporarily molded to fabricate a thin-plate member.

Next, the rectangular parallelepiped member and the thin-plate member formed of $Y_2O_3$ that are each temporarily molded are laminated by hot pressing to form a laminated structure. In this case, processing is performed, for example, at a temperature of 1350° C. for one hour with a pressing pressure of 48 kN in an $N_2$ atmosphere. Thereafter, the formed laminated structure is cooled down from the processing temperature to room temperature. The cooling may be performed by leaving the laminated structure in an atmosphere at or below room temperature, or may be performed forcibly by blowing air or the like.

Through these steps, the laminated structure having the body portion and the surface layer, that is, the low adhesion material in accordance with the present embodiment (corresponding to cavity member 6 having body portion 8 and surface layer 10 in FIG. 1) is completed. In the completed low adhesion material, the processing performed at a temperature as high as 1350° C. causes solid phase diffusion of $Y_2O_3$ contained in surface layer 10 into 3YSZ contained in body portion 8. Thereby, surface layer 10 is bonded to body portion 8.

Next, as shown in FIG. 1, cavity member 6 formed of the fabricated low adhesion material is attached to surrounding member 7 formed of an ordinary material for a resin molding die, for example, a steel material such as tool steel, a cemented carbide, or the like. Thereby, upper die 1, which is the resin molding die in accordance with the present embodiment, is completed.

Hereinafter, a relationship between a thickness of surface layer 10 formed of $Y_2O_3$ in the low adhesion material in accordance with the present embodiment and a fracture toughness value of the low adhesion material will be described with reference to FIG. 3. To evaluate the relationship, three samples (n=5) having different thicknesses of the surface layer were fabricated to measure a fracture toughness value of each sample by JIS IF method (JIS R 1607) (indentation load=1 kgf≈9.8 N). As a result, the samples having thicknesses of the surface layer of 1.4 mm, 0.9 mm, and 0.25 mm had fracture toughness of 0.9 MPa·m$^{1/2}$, 1.7 MPa·m$^{1/2}$, and 2.3 MPa·m$^{1/2}$, respectively. FIG. 3 shows the result obtained.

Compressive residual stress in the surface layer at an interface of body portion (support layer) 8 and surface layer 10 was calculated at about 682 MPa, from an equation for calculation. The equation for calculating compressive residual stress σ can be expressed by $\sigma = E \Delta \alpha \cdot \Delta T / (1-\nu)$, where E represents a longitudinal elastic modulus of the surface layer, ν represents a Poisson's ratio, Δα represents a difference in linear expansion coefficients of the support layer (body portion) and the surface layer, and ΔT is a difference between a processing temperature and a use temperature. Further, on this occasion, each parameter has a value as follows: E=171 GPa, ΔT=1350−20=1330° C., and ν=0.3. It is to be noted that a fracture toughness value in a range indicated by hatching in FIG. 3 is a fracture toughness value obtained when the resin molding die is formed of $Y_2O_3$ alone.

Figure 3:
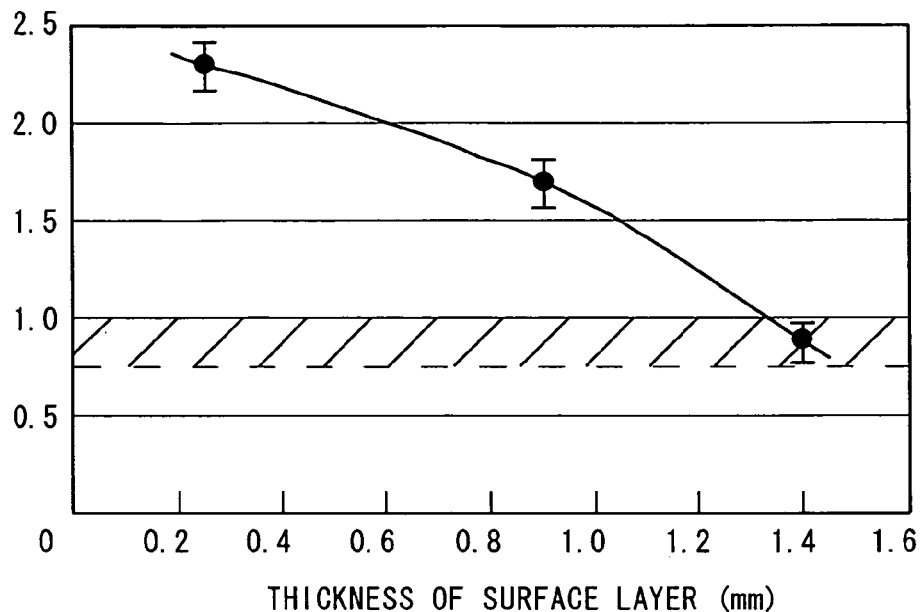
FIG. 3 is an explanatory view showing a relationship between a thickness of a surface layer in the low adhesion material in accordance with the first embodiment of the present invention and a fracture toughness value of the low adhesion material.

FIG. 3 shows a relationship that the fracture toughness value is increased as a distance from the interface between body portion 8 and surface layer 10 to a surface of surface layer 10 shown in FIG. 1 is reduced, in other words, as surface layer 10 having compressive residual stress therein has a reduced thickness. Considering this relationship and the fracture toughness value obtained when the resin molding die is formed of $Y_2O_3$ alone, a thickness of surface layer 10 appropriate as a low adhesion material should be not more than 1.2 mm, and is preferably as small as possible. It is considered that a preferred thickness of surface layer 10 is not more than 1.0 mm, and a more preferred thickness thereof is not more than 0.25 mm. Further, a lower limit of the thickness of surface layer 10 may be satisfactorily specified as long as it allows a substance forming surface layer 10 to form a unit lattice (for example, about several nanometers).

In the present embodiment, among the members forming upper die 1, rectangular parallelepiped cavity member 6 constituting inner bottom surface 5 of cavity 4 is formed of the low adhesion material in accordance with the present embodiment. Instead, a member constituting an inner bottom surface of resin flow channel 3 may be formed of the low adhesion material in accordance with the present embodiment. Further, in the resin molding die, a portion of the die surface including all (or most) of the surface exposed to the fluid resin may be formed of the low adhesion material in accordance with the present embodiment.

For example, a portion including inner bottom surface 5 of cavity 4 and the inner bottom surface of resin flow channel 3 in FIG. 1 may be formed of the low adhesion material in accordance with the present embodiment. It is essential only that body portion 8 of cavity member 6 is provided to overlap at least a portion of the die surface exposed to the fluid resin when seen in a plane, and surface layer 10 is formed on the surface of body portion 8 to constitute at least a portion of the die surface exposed to the fluid resin.

Second Embodiment

Figure 4:
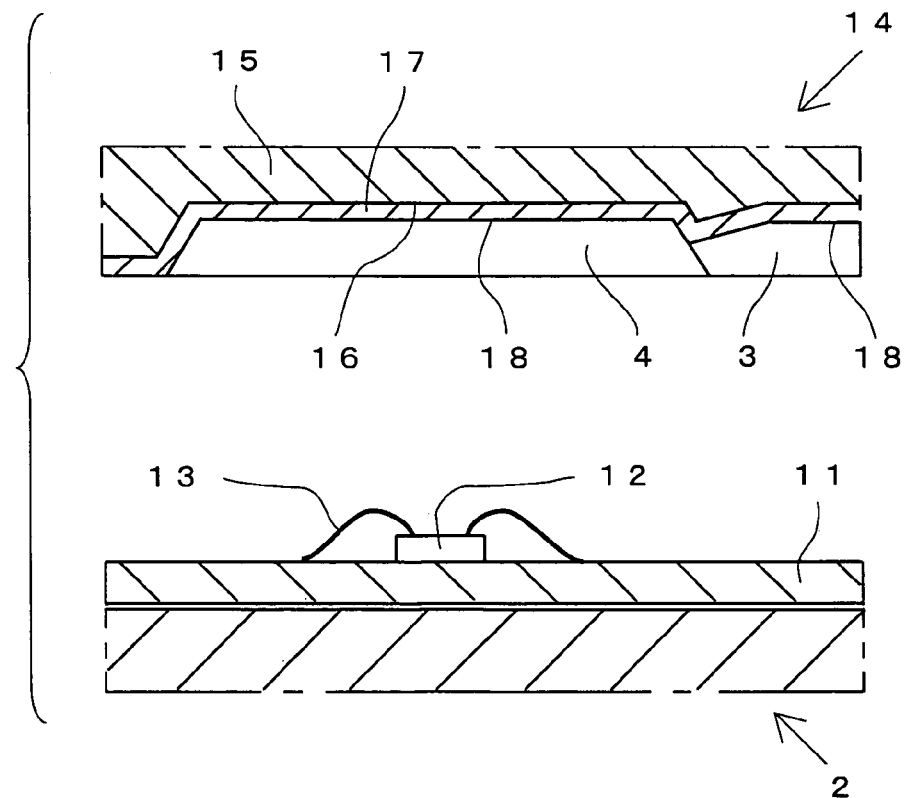
FIG. 4 is a cross sectional view showing a resin molding die in accordance with a second embodiment of the present invention.

A resin molding die and a low adhesion material in accordance with a second embodiment of the present invention will be described with reference to FIG. 4. The low adhesion material in accordance with the present embodiment is a laminated structure including a body portion having a concave portion provided in a surface (one surface: an undersurface in the drawing) of a rectangular parallelepiped base material, and a surface layer formed on the surface. FIG. 4 is a cross sectional view showing the resin molding die in accordance with the present embodiment.

An upper die 14 shown in FIG. 4 corresponds to the low adhesion material and the resin molding die in accordance with the present embodiment. Upper die 14 is formed of the low adhesion material in accordance with the present embodiment. Specifically, upper die 14 includes a body portion 15, and a surface layer 17 formed on an entire undersurface 16 of body portion 15 exposed to a fluid resin. Accordingly, all of the die surface of upper die 14 exposed to the fluid resin is formed of surface layer 17.

Body portion 15 is formed of the same materials as those of body portion 8 in the first embodiment, that is, the first material of 3YSZ and the second material of ZrN having conductivity. Surface layer 17 is formed of the same material as that of surface layer 10 in the first embodiment, that is, a material containing at least one of $Y_2O_3$, a $Y_2O_3$ solid solution, and an yttria composite oxide.

Also in the present embodiment, surface layer 17 is formed of $Y_2O_3$. According to the present embodiment, since surface layer 17 is present on a die surface 18 exposed to the fluid resin, the same effect as that obtained by the resin molding die and the low adhesion material shown in FIG. 1 can be obtained.

The resin molding die shown in FIG. 4 is obtained as described below. Firstly, a rectangular parallelepiped raw material is machined as appropriate by cutting or the like to form a concave portion corresponding to resin flow channel 3 and cavity 4. Then, surface layer 17 in the shape of a layer (film) is formed on undersurface 16 in which the concave portion is formed, using an appropriate method among well known methods.

Well known methods described herein include, for example, various coating methods such as CVD (Chemical Vapor Deposition), sol-gel method, thermal spraying, and the like, hot press lamination of sheet materials, and the like. Also by these well known methods, surface layer 17 is formed at a prescribed high temperature and a certain amount of compressive residual stress is caused in surface layer 17 after it is cooled down, as in the method described in the first embodiment.

In each of the embodiments described above, a resin molding die used when sealing chip 12 mounted on board 11 with resin has been described as an example. The present invention is not limited thereto, and is applicable to a resin molding die used when molding a molded object by filling a cavity with a fluid resin and then setting the fluid resin, as in transfer molding, injection molding, compression molding, or other similar common techniques.

Body portions 8 and 15 may be formed of an ordinary material for a resin molding die, for example, a steel material such as tool steel, a cemented carbide, or the like. Further, compressive residual stress can be caused to be present in surface layers 10 and 17 by appropriately determining the thermal expansion coefficients of body portions 8 and 15 and surface layers 10 and 17, as in the embodiments described above.

Furthermore, in each of the embodiments, a low adhesion material in accordance with the present invention and a resin molding die using the same have been described. The present invention is not limited thereto, and the low adhesion material can be used for an application other than a resin molding die that requires low wettability with respect to a basic substance and also requires wear resistance and impact resistance. Specifically, the low adhesion material in accordance with the present invention can be used for coating a portion of a member or the like exposed to a fluid resin, or for other similar purposes.

Further, the low adhesion material in accordance with the present invention can be used for an application that requires wear resistance and impact resistance in addition to a low adhesion property with respect to a basic substance other than resin. For example, such a low adhesion material can be used as a material having a function preventing adhesion of soil made of an organic substance. Specifically, the low adhesion material of the present invention would be used as a material for a building material forming an outer wall of a building or the like, a bathtub, sanitary chinaware, or other similar equipment. The low adhesion material of the present invention may also be used as a material for coating a surface of a member used in these applications.

It is to be noted that low adhesion material 3 described above can also be used as a soil resistant material having a function preventing adhesion of soil made of an organic substance.

Although the present invention has been described and illustrated in detail, it is clearly understood that the same is by way of illustration and example only and is not to be taken by way of limitation, the scope of the present invention being limited only by the terms of the appended claims.

The invention claimed is:

1. A low adhesion material having a low adhesion property with respect to a basic substance, comprising:
a body portion; and
a surface layer formed on at least a portion of a surface of said body portion,
wherein said surface layer is formed of a material having a low adhesion property with respect to said basic substance and a thermal expansion coefficient smaller than that of said body portion,
said surface layer is formed on said body portion by heat treatment, said body portion and said surface layer are cooled down to cause compressive residual stress in said surface layer, and the compressive residual stress exists in said surface layer,
said surface layer contains $Y_2O_3$,
said body portion is formed of a mixed material containing a first material and a second material having a thermal expansion coefficient smaller than that of the first material, and
said first material is mainly composed of $ZrO_2$.

2. A low adhesion material having a low adhesion property with respect to a basic substance, comprising:
a body portion; and
a surface layer formed on at least a portion of a surface of said body portion,
wherein said surface layer is formed of a material having a low adhesion property with respect to said basic substance and a thermal expansion coefficient smaller than that of said body portion,
said surface layer is formed on said body portion by heat treatment, said body portion and said surface layer are cooled down to cause compressive residual stress in said surface layer, and the compressive residual stress exists in said surface layer,
said surface layer contains at least one of a $Y_2O_3$ solid solution and an yttria composite oxide, and
said body portion is formed of a mixed material, a steel material, or a cemented carbide containing a first material and a second material having a thermal expansion coefficient smaller than that of the first material.

3. The low adhesion material according to claim 2, wherein said first material is mainly composed of $ZrO_2$.

4. The low adhesion material according to claim 1, wherein said mixed material has conductivity.

5. The low adhesion material according to claim 2, wherein said mixed material has conductivity.

6. A resin molding die used to set a fluid resin introduced into a cavity to form a set resin made of a basic substance and mold a molded object including the set resin, comprising:
a body portion provided in said resin molding die to overlap at least a portion of a die surface exposed to said fluid resin; and
a surface layer formed on a surface of said body portion to constitute at least a portion of the die surface exposed to said fluid resin,
wherein said surface layer is formed of a material having a low adhesion property with respect to said set resin and a thermal expansion coefficient smaller than that of said body portion,
said surface layer is formed on said body portion by heat treatment, said body portion and said surface layer are cooled down to cause compressive residual stress in said surface layer, and the compressive residual stress exists in said surface layer,
said surface layer contains $Y_2O_3$,
said body portion is formed of a mixed material containing a first material and a second material having a thermal expansion coefficient smaller than that of the first material, and
said first material is mainly composed of $ZrO_2$.

7. A resin molding die used to set a fluid resin introduced into a cavity to form a set resin made of a basic substance and mold a molded object including the set resin, comprising:
a body portion provided in said resin molding die to overlap at least a portion of a die surface exposed to said fluid resin; and
a surface layer formed on a surface of said body portion to constitute at least a portion of the die surface exposed to said fluid resin,
wherein said surface layer is formed of a material having a low adhesion property with respect to said set resin and a thermal expansion coefficient smaller than that of said body portion,
said surface layer is formed on said body portion by heat treatment, said body portion and said surface layer are cooled down to cause compressive residual stress in said surface layer, and the compressive residual stress exists in said surface layer,
said surface layer contains at least one of a $Y_2O_3$ solid solution and an yttria composite oxide, and
said body portion is formed of a mixed material, a steel material, or a cemented carbide containing a first material and a second material having a thermal expansion coefficient smaller than that of the first material.

8. The resin molding die according to claim 7, wherein said first material is mainly composed of $ZrO_2$.

9. The resin molding die according to claim 6, wherein said first material has conductivity.

10. The resin molding die according to claim 7, wherein said first material has conductivity.

11. A soil resistant material having a function preventing adhesion of soil made of an organic substance, comprising:
a body portion; and
a surface layer formed on at least a portion of a surface of said body portion,
wherein said surface layer is formed of a material having a low adhesion property with respect to a basic substance and a thermal expansion coefficient smaller than that of said body portion,
said surface layer is formed on said body portion by heat treatment, said body portion and said surface layer are cooled down to cause compressive residual stress in said surface layer, and the compressive residual stress exists in said surface layer,
said surface layer contains $Y_2O_3$,
said body portion is formed of a mixed material containing a first material and a second material having a thermal expansion coefficient smaller than that of the first material, and
said first material is mainly composed of $ZrO_2$.

12. A soil resistant material having a function preventing adhesion of soil made of an organic substance, comprising:

a body portion; and a surface layer formed on at least a portion of a surface of said body portion, wherein said surface layer is formed of a material having a low adhesion property with respect to a basic substance and a thermal expansion coefficient smaller than that of said body portion, said surface layer is formed on said body portion by heat treatment, said body portion and said surface layer are cooled down to cause compressive residual stress in said surface layer, and the compressive residual stress exists in said surface layer, said surface layer contains at least one of a $Y_2O_3$ solid solution and an yttria composite oxide, and said body portion is formed of a mixed material, a steel material, or a cemented carbide containing a first material and a second material having a thermal expansion coefficient smaller than that of the first material.

13. The soil resistant material according to claim 12, wherein said first material is mainly composed of $ZrO_2$.

14. The soil resistant material according to claim 11, wherein said mixed material has conductivity.

15. The soil resistant material according to claim 12, wherein said mixed material has conductivity.

* * * * *